(12) United States Patent
Carpini et al.

(10) Patent No.: US 9,363,585 B2
(45) Date of Patent: Jun. 7, 2016

(54) OPERATIONS ADMINISTRATION AND MANAGEMENT SERVICE FOR AN OPTICAL LAYER OF A COMMUNICATION NETWORK

(71) Applicant: Alcatel Lucent Canada Inc., Ottawa (CA)

(72) Inventors: Walter J. Carpini, Stittsville (CA); Don R. Ellis, Vanier (CA)

(73) Assignee: Alcatel Lucent, Boulogne-Billancourt (FR)

( * ) Notice: Subject to any disclaimer, the term of this patent is extended or adjusted under 35 U.S.C. 154(b) by 85 days.

(21) Appl. No.: 14/255,483

(22) Filed: Apr. 17, 2014

(65) Prior Publication Data
US 2015/0304743 A1   Oct. 22, 2015

(51) Int. Cl.
| | | |
|---|---|---|
| H04B 10/00 | (2013.01) | |
| H04Q 11/00 | (2006.01) | |
| H04B 10/077 | (2013.01) | |
| H04B 10/073 | (2013.01) | |
| H04J 14/02 | (2006.01) | |

(52) U.S. Cl.
CPC ......... *H04Q 11/0062* (2013.01); *H04B 10/073* (2013.01); *H04B 10/077* (2013.01); *H04J 14/0227* (2013.01); *H04J 14/0272* (2013.01); *H04Q 2011/0079* (2013.01); *H04Q 2011/0088* (2013.01); *H04Q 2213/13172* (2013.01); *H04Q 2213/13204* (2013.01)

(58) Field of Classification Search
CPC ................ H04Q 11/0062; H04Q 2213/13204; H04Q 2011/0079; H04Q 2213/13172; H04Q 2011/0088; H04B 10/077; H04B 10/073
See application file for complete search history.

(56) References Cited

U.S. PATENT DOCUMENTS

| | | | | |
|---|---|---|---|---|
| 5,663,820 A | * | 9/1997 | Shiragaki ............ | H04J 14/0212 370/360 |
| 6,088,144 A | * | 7/2000 | Doerr ................... | H04B 10/077 398/1 |
| 6,263,130 B1 | * | 7/2001 | Barnard ................. | H04J 14/02 385/24 |
| 6,366,379 B1 | * | 4/2002 | Terahara .............. | H04B 10/077 359/308 |
| 6,614,956 B2 | * | 9/2003 | Leng ................... | H04B 10/0773 385/24 |
| 6,819,879 B1 | * | 11/2004 | Wan .................... | H04B 10/5161 398/183 |
| 7,174,109 B2 | | 2/2007 | Wan | |
| 7,346,284 B2 | | 3/2008 | Wan | |
| 7,715,710 B2 | * | 5/2010 | Wan .................... | H04B 10/0775 385/24 |
| 7,869,709 B2 | * | 1/2011 | Wan ..................... | H04B 10/504 398/183 |

(Continued)

OTHER PUBLICATIONS

Wei, John. "The role of DCN in optical WDM networks." In Optical Fiber Communication Conference, p. FI1. Optical Society of America, 2000.

(Continued)

*Primary Examiner* — Danny Leung
(74) *Attorney, Agent, or Firm* — Mendelsohn Dunleavy, P.C.; Yuri Gruzdkov

(57) ABSTRACT

We disclose a network element having one or more OAM components that enable the network element to send and receive in-band service messages without disrupting the flow of user data on the wavelength channel(s) used for the transmission of said in-band service messages. When deployed in a transport plane of a communications network, a plurality of such network elements can advantageously be used to perform various OAM functions that support a link-fault-management mechanism in a manner that complements and strengthens the existing OAM capabilities, particularly at various intermediate points within the optical network path(s).

24 Claims, 6 Drawing Sheets

(56) References Cited

U.S. PATENT DOCUMENTS

| | | | |
|---|---|---|---|
| 8,509,620 B1* | 8/2013 | Saunders | H04J 14/0275 398/79 |
| 2004/0033080 A1* | 2/2004 | Eiselt | H04B 10/0775 398/180 |
| 2004/0208511 A1* | 10/2004 | Peddanarappagari | H04B 10/077 398/25 |
| 2009/0257757 A1 | 10/2009 | Wan et al. | |
| 2010/0086306 A1* | 4/2010 | D'Alessandro | H04L 45/12 398/79 |
| 2011/0236018 A1* | 9/2011 | Valiveti | H04L 63/0272 398/45 |
| 2012/0121258 A1* | 5/2012 | Li | H04B 10/272 398/37 |
| 2013/0004155 A1* | 1/2013 | Liang | H04Q 11/0067 398/9 |
| 2014/0177657 A1* | 6/2014 | Bowcutt | H04J 14/0201 370/535 |
| 2015/0304743 A1* | 10/2015 | Carpini | H04Q 11/0062 398/31 |

OTHER PUBLICATIONS

International Search Report and Written Opinion; Mailed Nov. 4, 2015 for PCT/IB2015/000946.

* cited by examiner

100

OPERATIONS ADMINISTRATION AND MANAGEMENT SERVICE FOR AN OPTICAL LAYER OF A COMMUNICATION NETWORK

BACKGROUND

1. Field

The present disclosure relates to optical communication equipment and, more specifically but not exclusively, to operations, administration, and management of network resources and services resources for an optical layer of a communication network.

2. Description of the Related Art

This section introduces aspects that may help facilitate a better understanding of the disclosure. Accordingly, the statements of this section are to be read in this light and are not to be understood as admissions about what is in the prior art or what is not in the prior art.

Operations, administration, and management (OAM) functions are used to detect faults, defects, and/or performance degradation in order to enable network operators to maintain and guarantee reliable user-data transport over their communication networks. Example OAM functions include but are not limited to continuous surveillance of network paths, e.g., for possible structural defects and/or performance degradation, and on-demand diagnosis of malfunctioning network paths, e.g., for defect localization. Optical-layer OAM protocols are not well defined yet in standardization committees, but are critical to troubleshooting optical-layer performance problems. Due to the increasing reliance of telecommunications service providers on optical transport, optical-layer network and service OAM protocols are currently being actively developed.

SUMMARY OF SOME SPECIFIC EMBODIMENTS

Disclosed herein are various embodiments of a network element having one or more OAM components that enable the network element to send and receive in-band service messages without disrupting the flow of user data on the wavelength channel(s) used for the transmission of the in-band service messages. When deployed in a transport plane of a communications network, a plurality of such network elements can advantageously be used to perform various OAM functions that support a link-fault-management mechanism in a manner that complements and strengthens the existing OAM capabilities, particularly at various intermediate points within the optical network path(s).

According to one embodiment, provided is an apparatus comprising a first network element configured to communicate with a second network element via an optical network path and further configured to: transmit a first in-band service message to the second network element using a first set of one or more subcarriers of a first wavelength channel; and receive a second in-band service message from the second network element of the optical network path using a second set of one or more subcarriers of a second wavelength channel. The first network element comprises: one or more OAM components, each comprising (i) a respective optical receiver coupled to the optical network path through an optical tap and configured to receive in-band service messages and (ii) a respective optical modulator coupled to the optical network path and configured to transmit in-band service messages without disrupting a flow of user data on a wavelength channel used for the transmission of the in-band service messages; and an electronic controller configured to cause one of the respective optical modulators to transmit the first in-band service message and further configured to receive an electric form of the second in-band service message from one of the respective optical receivers, wherein either the second in-band service message is responsive to the first in-band service message or the first in-band service message is responsive to the second in-band service message.

According to another embodiment, provided is a method of operating a network having an optical network path, the method comprising the steps of: at a first network element of the optical network path, (A) transmitting a first in-band service message to a second network element via the optical network path using a first set of one or more subcarriers of a first wavelength channel; and (B) receiving a second in-band service message from the second network element via the optical network path using a second set of one or more subcarriers of a second wavelength channel. Either the second in-band service message is responsive to the first in-band service message or the first in-band service message is responsive to the second in-band service message.

According to yet another embodiment, provided is an optical network comprising: an optical network path that comprises an end network element and an intermediate network element configured to communicate with one another using one or more wavelength channels; and a service controller configured to carry out a wavelength-channel service protocol using the end network element and the intermediate network element. The end network element is configured to: receive a first out-of-band service message corresponding to the wavelength-channel service protocol from the service controller; and in response to the first out-of-band service message, transmit a first in-band service message corresponding to the wavelength-channel service protocol to the intermediate network element via the optical network path. The intermediate network element is configured to: receive the first in-band service message corresponding to the wavelength-channel service protocol from the end network element via the optical network path; and in response to the first in-band service message, transmit a second in-band service message corresponding to the wavelength-channel service protocol to the end network element via the optical network path.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

The following acronyms/abbreviations may be used in the description of embodiments and/or in the accompanying drawings:

CCM Continuity Check Message;
E/O Electrical-to-Optical;
IP Internet Protocol;
LFM Link Fault Management;
NE Network Element;
OAM Operations, Administration, and Management (or Maintenance);
O/E Optical-to-Electrical;
OEO Optical-to-Electrical-to-Optical;
OPM Optical Performance Monitor;
OSC Optical Supervisory Channel;
RDI Remote Defect Indication;
TDM Time Division Multiplexing;
WC Wavelength Channel;
WCCP Wavelength Continuity-Check Protocol;
WDM Wavelength Division Multiplexing;
WPP Wavelength Ping Protocol;
WSS Wavelength-Selective Switch; and
WTRP Wavelength Trace Route Protocol.

Figure 1:
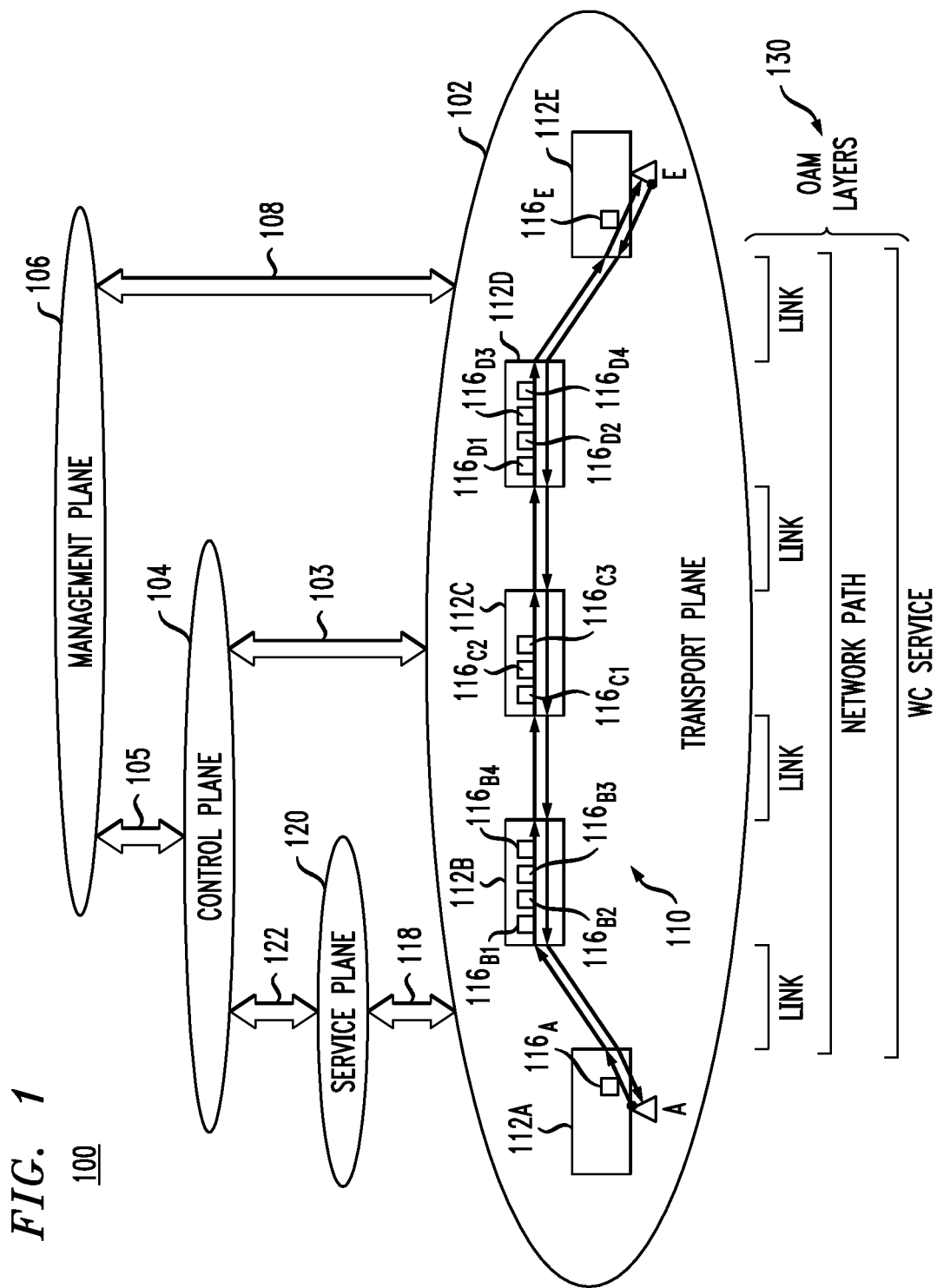
FIG. 1 shows a block diagram of a communication network according to an embodiment of the disclosure.

FIG. 1 shows a block diagram of a communications network 100 according to an embodiment of the disclosure. Network 100 comprises a plurality of functional planes, only four of which are shown in FIG. 1 for illustration purposes. The shown functional planes are a transport plane 102, a control plane 104, a management plane 106, and a service plane 120.

Transport plane 102 includes network resources configured to transport user data between different locations using optical transport links. An optical transport link may be bidirectional or unidirectional. In an example embodiment, transport plane 102 may also be configured to transport some OAM signals and/or service messages, e.g., carrying monitoring, control, service, and management information.

As an example, FIG. 1 shows an endpoint-to-endpoint optical network path 110 in transport plane 102. More specifically, network path 110 is configured to connect, in a bidirectional manner, endpoint A and endpoint E and is illustratively shown as having a plurality of links that serially connect network elements (NEs) 112A-112E. In general, an endpoint, such as each of endpoints A and E, is a network location where a wavelength channel originates and/or terminates. As such, an endpoint includes an optical transmitter and/or an optical receiver (not explicitly shown in FIG. 1). The optical transmitter performs an electrical-to-optical (E/O) signal conversion and applies the resulting modulated optical signal to an optical fiber. The optical receiver performs an optical-to-electrical (O/E) signal conversion and processes the resulting electrical signal to recover the data encoded in the modulated optical signal received from the optical fiber. In an example embodiment, network path 110 is an optically transparent network path, in which an optical signal that is being transported therethrough does not undergo an optical-to-electrical-to-optical (OEO) conversion along the way between endpoints A and E.

Each of endpoints A and E and NEs 112A-112E may include one or more OAM components, each configured to perform one or more of the following: (i) non-intrusive monitoring of the corresponding wavelength channel(s); (ii) reporting the monitoring results to the competent entities in the host NE 112, in one or more other NEs 112, in control plane 104, in management plane 106, and/or in service plane 120; (iii) sending in-band and out-of-band OAM service messages to other OAM components; (iv) receiving in-band and out-of-band OAM service messages from other OAM components; and (v) exchanging out-of-band OAM service messages with control plane 104, management plane 106, and/or service plane 120.

As used herein, the term "non-intrusive" should be construed as meaning without interrupting the in-band optical flow of data. The term "in-band" means using one or more optical carriers from a WDM set used for user-data transport in transport plane 102 and network path 110. Subcarriers or dither tones that are spectrally located within the bandwidth allocated to the optical carrier are considered to be in-band. The term "out-of-band" should be construed as indicating the use of communications means that do not rely on or utilize any of the optical carriers from the WDM set or any of their subcarriers. An example of such out-of-band communications means is the Internet Protocol (IP) implemented over a wireline, wireless, or OSC connection. Note that, despite being "optical," an OSC is not considered to be an in-band wavelength channel because an OSC does not typically transport user data.

NE 112A is illustratively shown in FIG. 1 as having an OAM component $116_A$. NE 112B is illustratively shown as having OAM components $116_{B1}$-$116_{B4}$. NE 112C is illustratively shown as having OAM components $116_{C1}$-$116_{C3}$, etc. For clarity of depiction, the OAM component(s) located at endpoints A and E are not explicitly shown in FIG. 1, but such OAM components may generally be similar to OAM components 116. One of ordinary skill in the art will understand that, in various alternative embodiments, different network elements and endpoints may have different respective numbers of OAM components. Some network elements may have zero OAM components 116. Some OAM components 116 may be located at an interface or edge of the corresponding NE 112, whereas some other OAM components 116 may be internal components of the corresponding NE 112.

An example structure of NE 112 is described in more detail below in reference to FIG. 2. One of ordinary skill in the art will understand that transport plane 102 may have a plurality of reconfigurable optical network paths similar to network path 110, e.g., each being a topological component of an underlying mesh network. The corresponding access groups, sub-networks, and fiber links typically define the topology of the mesh network and, as such, may vary significantly between different embodiments of transport plane 102.

Control plane 104 is configured to perform call-control functions, connection-control functions, and some OAM-control functions. Some functions of control plane 104 may include automatic discovery, routing, and signaling and may be automated based on appropriate protocols. Management plane 106 is configured to perform management functions for transport plane 102, control plane 104, service plane 120, and communications network 100 as a whole. Management plane 106 may also coordinate the operation of all functional planes in network 100. Although each of planes 102, 104, 106, and 120 may be substantially autonomous, there is some interaction between the planes because they operate on a common underlying resource. For example, transport plane 102 and control plane 104 interact via a control path 103. Control plane 104 and management plane 106 interact via a control path 105. Transport plane 102 and management plane 106 interact via a control path 108. Control plane 104 and service plane 120 interact via a control path 122. Service plane 120 and transport plane 106 interact via a control path 118.

Conventionally, different NEs 112 and OAM components 116 are configured to exchange OAM service messages exclusively out-of-band, the messages being transmitted via control plane 104 and different (for uplink and downlink transmissions) sub-paths of control path 103. However, according to an example embodiment of the disclosure, different NEs 112 and OAM components 116 are designed and configured to additionally exchange OAM service messages via network path 110, in-band and without interrupting the optical flow of user data therein. For example, a modulated optical carrier that carries user data, e.g., at a rate greater than about 2.5 Gbit/s, can additionally be modulated using one or more relatively low-frequency (e.g., about 1 MHz) dither tones or subcarriers, e.g., as described in U.S. Pat. Nos. 7,346, 284 and 7,869,709, both of which are incorporated herein by reference in their entirety. The depth of amplitude modulation corresponding to a dither tone or subcarrier may be relatively small, e.g., about 4%, in order not to have a noticeable adverse effect on the transmission of payload data. The non-payload data, e.g., corresponding to OAM service messages to be transmitted between different NEs 112 and/or different OAM components 116, may be encoded in the phase of the dither tone or subcarrier. Different sets of dither tones/subcarriers may be assigned to different wavelength channels to uniquely identify each of the wavelength channels.

As used herein, the term "wavelength channel" refers to a modulated or non-modulated optical carrier wavelength (frequency) that can be routed between endpoints in transport plane 102. Different wavelength channels may have different carrier wavelengths or the same carrier wavelength. In the latter case, different wavelength channels normally have different originating endpoints and routes and may be referred to as different instances of the wavelength channel having a specific carrier wavelength. All subcarriers that are located within the spectral band allocated in the system to an optical carrier are considered to be a part of the wavelength channel corresponding to that optical carrier.

Alternative embodiments of OAM component 116 and NE 112 may benefit from the use of at least some of the circuits and methods for in-band transmission of non-payload data disclosed, e.g., in U.S. Pat. Nos. 6,263,130, 6,614,956, 6,819,879, 7,174,109, 7,715,710, and 8,509,620 and U.S. Patent Application Publication Nos. 2004/0033080 and 2011/0236018, all of which are incorporated herein by reference in their entirety.

The above-described capability of different NEs 112 and OAM components 116 in network 100 to exchange in-band OAM service messages can advantageously be leveraged, e.g., as further described below in reference to FIGS. 3-6, to provide better visibility of wavelength-channel (WC) behavior in the relevant optical network path(s) within transport plane 102. In an example embodiment, service plane 120 includes network resources that enable the novel WC service layer in a plurality 130 of OAM layers in transport plane 102. In an example embodiment, service plane 120 relies on the in-band service messages to carry out various WC-service protocols and procedures such that only the endpoint NEs, such as NE 112A and NE 112E, need to be directly connected to control path 118. In contrast, the intermediate NEs, such as NE 112B, NE 112C, and NE 112D, do not require a direct connection to control path 118 for supporting these WC-service protocols because the NEs can be configured to use in-band service messages received and sent via optical network path 110 to properly participate in the protocols and timely and appropriately execute the corresponding protocol parts. For example, each of intermediate NEs 112B-112D can use in-band service messages corresponding to the WC service layer to receive instructions from service plane 120 and then report back to the service plane after the instructions have been executed, with the instructions and reports being transmitted (i) in-band, via optical network path 110, between the corresponding intermediate NE and the corresponding endpoint NE, and (ii) out-of-band, via control path 118, between the endpoint NE and service plane 120. Examples of such transmissions are described in more detail below in reference to FIGS. 3-5.

Figure 2:
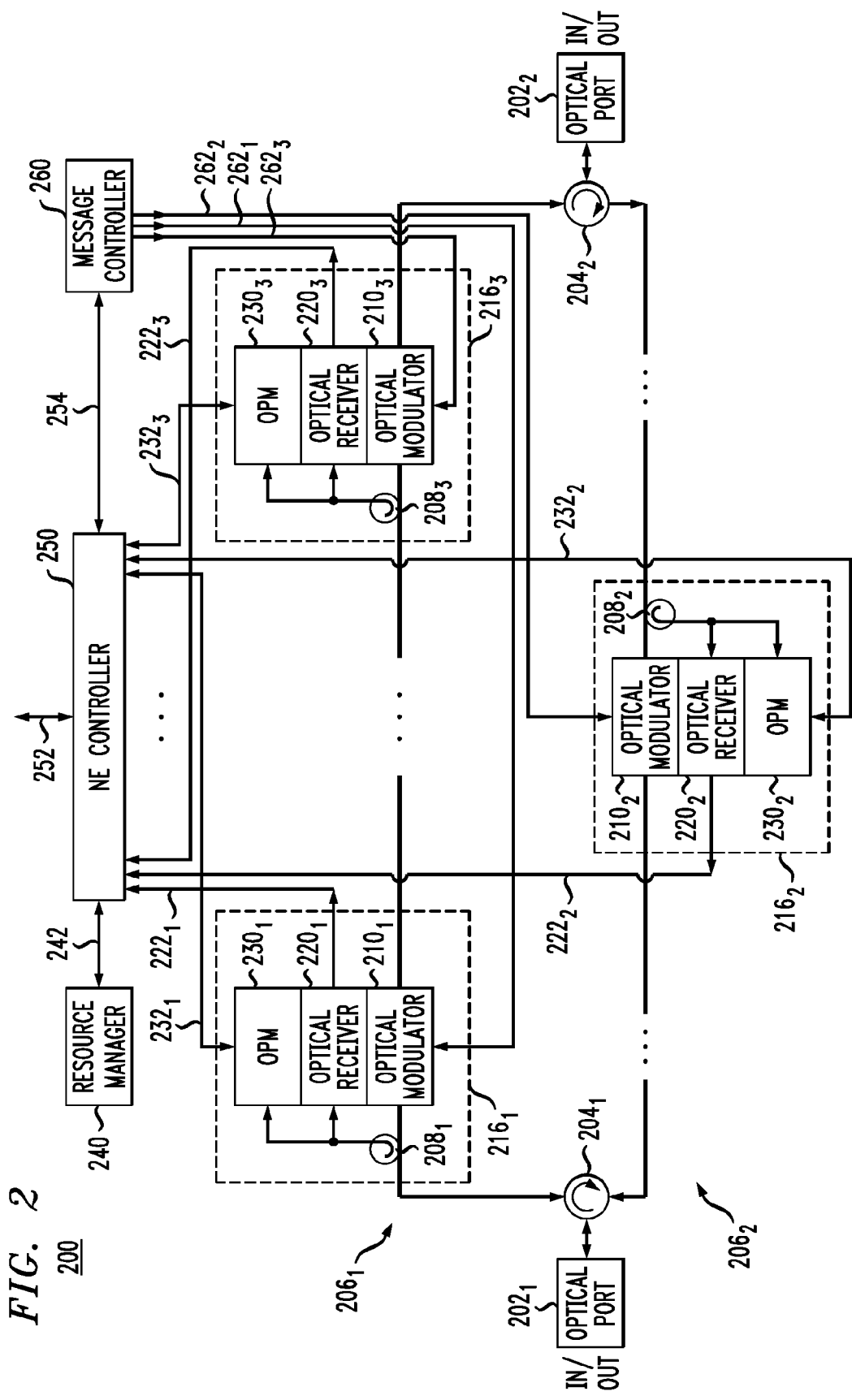
FIG. 2 shows a block diagram of a network element that can be used in the communication network of FIG. 1 according to an embodiment of the disclosure.

FIG. 2 shows a block diagram of a network element (NE) 200 that can be used as a network element 112 (FIG. 1) according to an embodiment of the disclosure. NE 200 has bidirectional optical ports $202_1$ and $202_2$. For example, when NE 200 is configured as NE 112A (FIG. 1), optical port $202_1$ is connected to endpoint A, and optical port $202_2$ is connected to the optical fiber that connects it to NE 112B. When NE 200 is configured as NE 112B (FIG. 1), optical port $202_1$ is connected to the optical fiber that connects it to NE 112A, and optical port $202_2$ is connected to the optical fiber that connects it to NE 112C, etc. When NE 200 is configured as NE 112E (FIG. 1), optical port $202_1$ is connected to the optical fiber that connects it to NE 112D, and optical port $202_2$ is connected to endpoint E.

The bi-directionality of optical ports $202_1$ and $202_2$ is enabled by optical circulators $204_1$ and $204_2$, as indicated in FIG. 2. More specifically, optical circulator $204_1$ is configured to (i) direct the incoming optical traffic received by optical port $202_1$ to a first optical branch $206_1$ in NE 200 and (ii) direct the outgoing optical traffic from a second optical branch $206_2$ in NE 200 to optical port $202_1$. Optical circulator $204_2$ is similarly configured to (i) direct the incoming optical traffic received by optical port $202_2$ to optical branch $206_2$ and (ii) direct the outgoing optical traffic from optical branch $206_1$ to optical port $202_2$.

In one embodiment, optical branches $206_1$ and $206_2$ may be configured to carry different wavelength channels or different instances of a specific wavelength channel. This configuration may be implemented, e.g., by replacing optical circulator $204_1$ by a first wavelength-selective switch (WSS), and by replacing optical circulator $204_2$ by a second WSS. One of ordinary skill in the art will understand that a similar modification is also possible using WDM multiplexers and de-multiplexers.

In an alternative embodiment, NE 200 may have additional optical branches analogous to optical branches $206_1$ and $206_2$, and additional optical ports analogous to optical ports $202_1$ and $202_2$ (not explicitly shown in FIG. 2). The optical branches connected between different pairs of ports 202 may be configured to carry different wavelength channels, in which case one or more WSSs and/or WDM multiplexers and de-multiplexers (not explicitly shown in FIG. 2) may be used in NE 200 to appropriately route the wavelength channels through the various optical branches 206.

Each of optical branches $206_1$ and $206_2$ may include one or more OAM components 216. When NE 200 is used as NE 112, each OAM component $216_i$ (where i=1, 2, 3) operates as a corresponding one of OAM components 116 (see FIG. 1). Optical branch $206_1$ is illustratively shown in FIG. 2 as having OAM components $216_1$ and $216_3$. Optical branch $206_2$ is illustratively shown as having OAM component $216_2$. As already indicated above in reference to NEs 112 (FIG. 1), the number of OAM components in a network element, such as the number of OAM components 216 in NE 200, depends on the specific embodiment of the network element and may be different from three.

In an example embodiment, OAM component $216_i$ includes an optical modulator $210_i$, an optical receiver $220_i$, and an optical performance monitor (OPM) $230_i$. Optical receiver $220_i$ and OPM $230_i$ are optically coupled to the corresponding optical branch 206 via an optical tap $208_i$ that is configured to divert a relatively small portion of the optical power from the corresponding branch 206 while directing most of the optical power through optical modulator $210_i$.

Optical receiver $220_i$ is configured to receive in-band OAM service messages intended for OAM component $216_i$. In an example embodiment, optical receiver $220_i$ has a photo-detector and an electrical signal-processing circuit (neither explicitly shown in FIG. 2). The photo-detector is configured to perform an O/E signal conversion, thereby converting the tapped portion of the modulated optical signal traveling through the corresponding optical branch 206 into a corresponding electrical signal. The electrical signal-processing circuit is configured to process the electrical signal to recover the in-band OAM service message encoded in the dither tone(s) or subcarrier(s) of the modulated optical signal. Optical receiver $220_i$ can then provide the electrical form of the recovered OAM service message, via an electrical control path $222_i$, to a network-element (NE) controller 250.

OPM $230_i$ is configured to monitor one or more attributes and/or characteristics of a selected wavelength channel in the corresponding optical branch 206. Examples of such attributes and/or characteristics include but are not limited to presence or absence of a particular instance of the wavelength channel, optical-power level, wavelength-channel identity, etc. From time to time, OPM $230_i$ may report the monitoring results to NE controller 250 via an electrical control path $232_i$. NE controller 250 may also use electrical control path $232_i$ to configure OPM $230_i$ for a desired monitoring function, e.g., in embodiments where the OPM is designed to perform a plurality of different monitoring functions and is configurable to rotate or alternate between them.

NE controller 250 may be configured to perform one or more of the following example functions:
  (i) Receive an OAM request. The OAM request may originate from a user, control plane 104 (FIG. 1), management plane 106, or service plane 120 (FIG. 1) and be received via an electrical control path 252. In one embodiment, electrical control path 252 may be a sub-path of control path 118 (see FIG. 1). Alternatively or in addition, an OAM request may originate from another NE 112 in transport plane 102. In this situation, the OAM request may be received via one of electrical control paths $222_i$ (where i=1, 2, 3) following receipt of the corresponding in-band OAM service message by the corresponding one of optical receivers $220_i$;
  (ii) Coordinate the execution of an OAM function by different relevant modules within NE 200;
  (iii) Retrieve information about an association of the relevant OAM resources and related physical resources (nodal and network). Depending on where this information is stored, NE controller 250 may use for this retrieval either an electrical control path 242 that connects the NE controller to a resource manager 240 or electrical control path 252;
  (iv) Receive OPM information from OPMs $230_i$ (where i=1, 2, 3) via electrical control paths $232_i$;
  (v) Initiate an OAM request to other NEs 112 (FIG. 1). The OAM request may be sent in-band via a path that includes an electrical control path 254, a message controller 260, one of electrical control paths $262_i$ and a corresponding optical modulator $210_i$ (where i=1, 2, 3); and
  (vi) Send a response to a previously received OAM request. This response can be sent out-of-band via electrical control path 252 or in-band via a path that includes electrical control path 254, message controller 260, one of electrical control paths $262_i$ and the corresponding optical modulator $210_i$ (where i=1, 2, 3).

Resource manager 250 may be configured to perform one or more of the following example functions:
  (A) Maintain a database of wavelength-channel instances and physical resources that affect each of the wavelength-channel instances;
  (B) Maintain and update a table of logical entities (e.g., photonic cross-connections in network 100, and the like) associated with each of the wavelength-channel instances handled by NE 200; and
  (C) Maintain a table that lists associations between forward and reverse paths in transport plane 102 (FIG. 1).

Message controller 260 is configured to control communications with other NEs 112 in transport plane 102 (FIG. 1). In the course of the communications, message controller 260 may send and receive OAM service messages, both in-band and out-of-band. Out-of-band OAM service messages may be sent and received via a path that includes electrical control path 254, NE controller 250, and electrical control path 252. An in-band OAM service message may be received using one of optical receivers $220_i$ (where i=1, 2, 3), which may be configured to direct the received message to message controller 260 via a path that includes the corresponding electrical control path $222_i$, NE controller 250, and electrical control path 254. An in-band OAM service message may be sent using one of optical modulators $210_i$ (where i=1, 2, 3) by directing the message to the optical modulator via the corresponding electrical control path $262_i$. Based on the message received from message controller 260, optical modulator $210_i$ can then generate, as known in the art, appropriate drive signals that enable the optical modulator to imprint the message onto the selected one or more dither tones or subcarriers in the corresponding wavelength channel that is being transmitted through the corresponding optical branch 206. To avoid collisions between different in-band OAM service messages transmitted on the same set of dither tones or subcarriers of the corresponding wavelength channel by different NEs 112 (FIG. 1) or different OAM components 216 in NE 200, a suitable TDM scheme may be employed by message controller 260 and similar message controllers in other NEs 112 of transport plane 102.

In some embodiments, e.g., when NE 200 is configured to operate as an intermediate NE in the corresponding optical network path, such as one of NEs 112B-112D in network path 110 (FIG. 1), electrical control path 252 may be disabled or absent.

Figure 3:
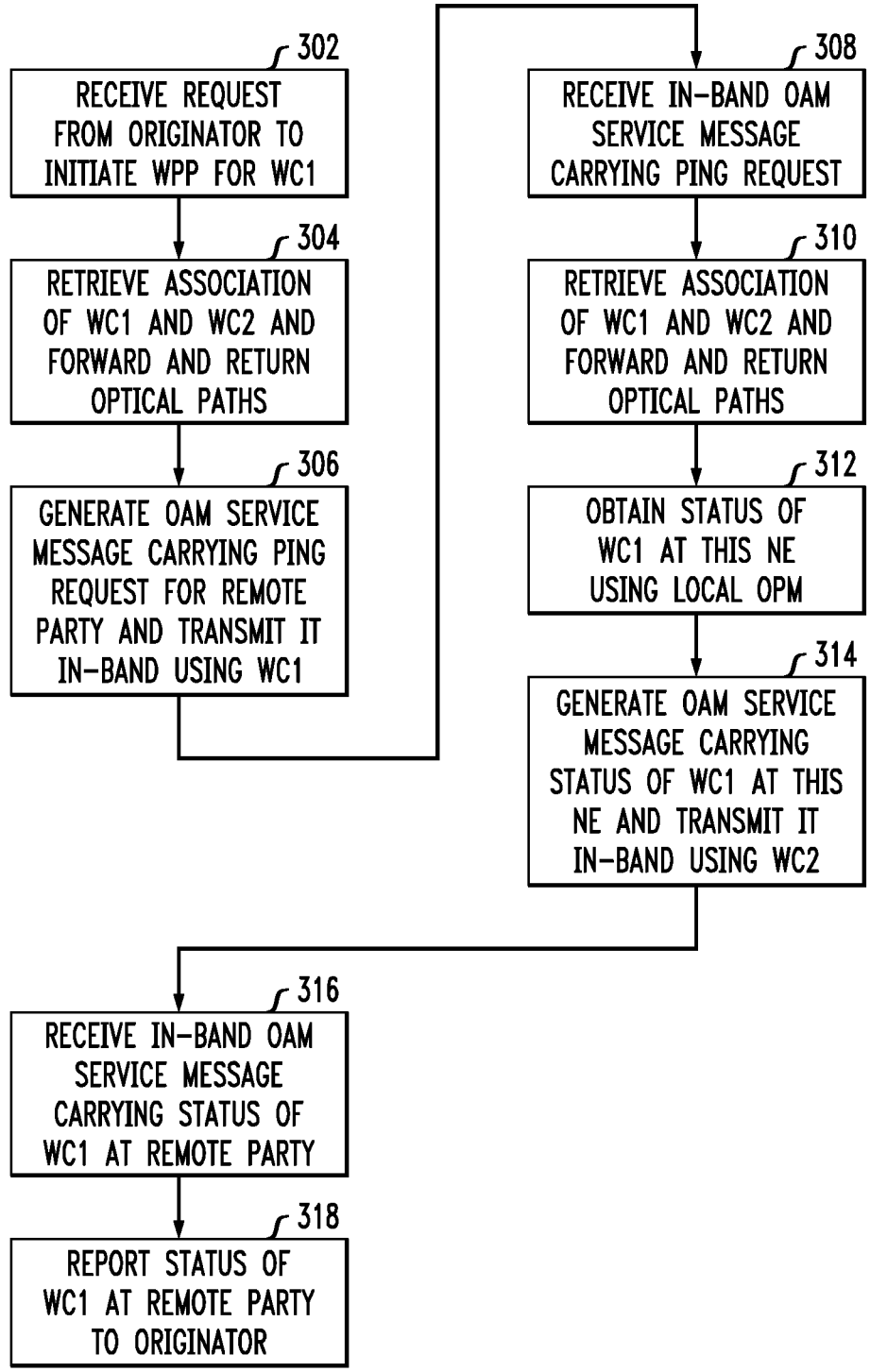
FIG. 3 shows a flowchart of a method of transmitting OAM service messages according to an embodiment of the disclosure.

FIG. 3 shows a flowchart of a method 300 of transmitting OAM service messages according to an embodiment of the disclosure. More specifically, method 300 implements a wavelength ping protocol (WPP) configured to determine whether or not one network location (e.g., endpoint A, FIG. 1) can communicate with another network location (e.g., endpoint E, FIG. 1) over the corresponding optical network path (e.g., network path 110, FIG. 1) and using a particular wavelength channel. One of ordinary skill in the art will understand that multiple instances of method 300 carried out at a plurality of network locations in network 100 can be used to troubleshoot connectivity problems within transport plane 102 (FIG. 1), e.g., to detect failed optical links and components therein.

For illustration purposes, method 300 is shown and described in reference to NEs 112A and 112E (FIG. 1). The description also assumes that each of these NEs is implemented using a respective instance (copy) of NE 200 (FIG. 2). The description of the various steps of method 300 is given in continuing reference to FIGS. 1-3. Based on the provided description, one of ordinary skill in the art will understand how to implement method 300 in other configurations, e.g., involving endpoints, intermediate points in different NEs, and/or other embodiments of OAM components.

At step 302 of method 300, NE controller 250 of NE 112A receives a request from an originator, e.g., via electrical control path 252, to initiate a WPP for WC1. The originator can be a user, a network operator, or a competent entity in control plane 104, management plane 106, or service plane 120. In this example, the request identifies NE 112E as the remote party to be pinged.

At step 304, in response to the request of step 302, NE controller 250 of NE 112A retrieves, from resource manager 240, the association of the wavelength channels and forward and return optical paths between NE 112A and NE 112E. For this example, we assume that the retrieved association specifies that the forward optical path is associated with WC1 and the return optical path is associated with WC2.

At step 306, NE controller 250 instructs message controller 260 to generate an OAM service message carrying a ping request for the remote party to be pinged (e.g., NE 112E). In response to this instruction, message controller 260 configures an appropriate one of OAM components 216 in NE 112A to send the generated OAM service message in-band using WC1. For this example, we assume that the appropriate OAM component is OAM component $216_1$. As indicated above, to send an in-band message using OAM component $216_1$, message controller 260 directs the generated OAM service message to optical modulator $210_1$ via electrical control path $262_1$. In response to the message received from message controller 260, optical modulator $210_1$ generates appropriate drive signals causing the optical modulator to imprint the OAM service message generated by message controller 260 onto the selected one or more dither tones or subcarriers in WC1, thereby transmitting the OAM service message in-band, along network path 110.

At step 308, an appropriate one of OAM components 216 in NE 112E receives the in-band OAM service message carrying the ping request transmitted by NE 112A at step 306. For this example, we assume that the appropriate OAM component is OAM component $216_3$. Hence, optical receiver $220_3$ in OAM component $216_3$ receives the in-band OAM service message, performs an appropriate O/E conversion of the message, and then directs the resulting electrical signal, via electrical control path $222_3$, to NE controller 250 of NE 112E.

At step 310, in response to the OAM service message of step 308, NE controller 250 of NE 112E retrieves, from resource manager 240, the association of the wavelength channels and forward and return optical paths between NE 112A and NE 112E. As already indicated above in the description of step 304, the retrieved association specifies that the forward optical path to NE 112E is associated with WC1, and that the return optical path to NE 112A is associated with WC2.

At step 312, NE controller 250 of NE 112E configures OPM $230_3$ to report back to it the present monitoring results on the status of WC1 in NE 112E.

At step 314, NE controller 250 of NE 112E instructs message controller 260 to generate an OAM service message carrying the monitoring results reported at step 312. In response to this instruction, message controller 260 configures an appropriate one of OAM components 216 in NE 112E to send the generated OAM service message in-band using WC2. For this example, we assume that the appropriate OAM component is OAM component $216_2$. As such, message controller 260 directs the generated OAM service message to optical modulator $210_2$ via electrical control path $262_2$. In response to this message from message controller 260, optical modulator $210_2$ generates appropriate drive signals causing the optical modulator to imprint the OAM service message generated by message controller 260 onto the selected one or more dither tones or subcarriers in WC2, thereby transmitting the OAM service message in-band, along network path 110 back to NE 112A.

At step 316, an appropriate one of OAM components 216 in NE 112A receives the in-band OAM service message carrying the monitoring results transmitted by NE 112E at step 314. For this example, we assume that the appropriate OAM component is OAM component $216_2$ in NE 112A. Hence, optical receiver $220_2$ in OAM component $216_2$ receives the in-band OAM service message, performs an appropriate O/E conversion of the message, and then directs the resulting electrical signal, via electrical control path $222_2$, to NE controller 250 of NE 112A.

At step 318, NE controller 250 of NE 112A reports the monitoring results received at step 316 back to the originator that initiated the WPP at step 302. The reporting message can be transmitted to the originator, e.g., via electrical control path 252.

One of ordinary skill in the art will understand that the above-provided description of steps 302-318 corresponds to a successful implementation of the WPP. A fault in network path 110 will cause the processing of steps 302-318 to break down, and a different OAM procedure may need to be invoked to locate the fault. In the case of a fault, no response to the ping request is received, and, after the ping request is timed out, NE controller 250 of NE 112A may use step 318 to report to the originator that the WPP for network path 110 using WC1 and WC2 was unsuccessful.

While method 300 is described above in reference to an embodiment, in which WC1 and WC2 represent two different wavelength channels (having two different carrier wavelengths), possible embodiments are not so limited. For example, in an alternative embodiment, WC1 and WC2 may represent different instances of the same wavelength channel and, as such, may nominally have the same carrier wavelength. However, the sets of dither tones or subcarriers assigned to the transmission of OAM service messages using WC1 and WC2 may still be different for the forward and return paths despite the carrier wavelength being the same.

Figure 4:
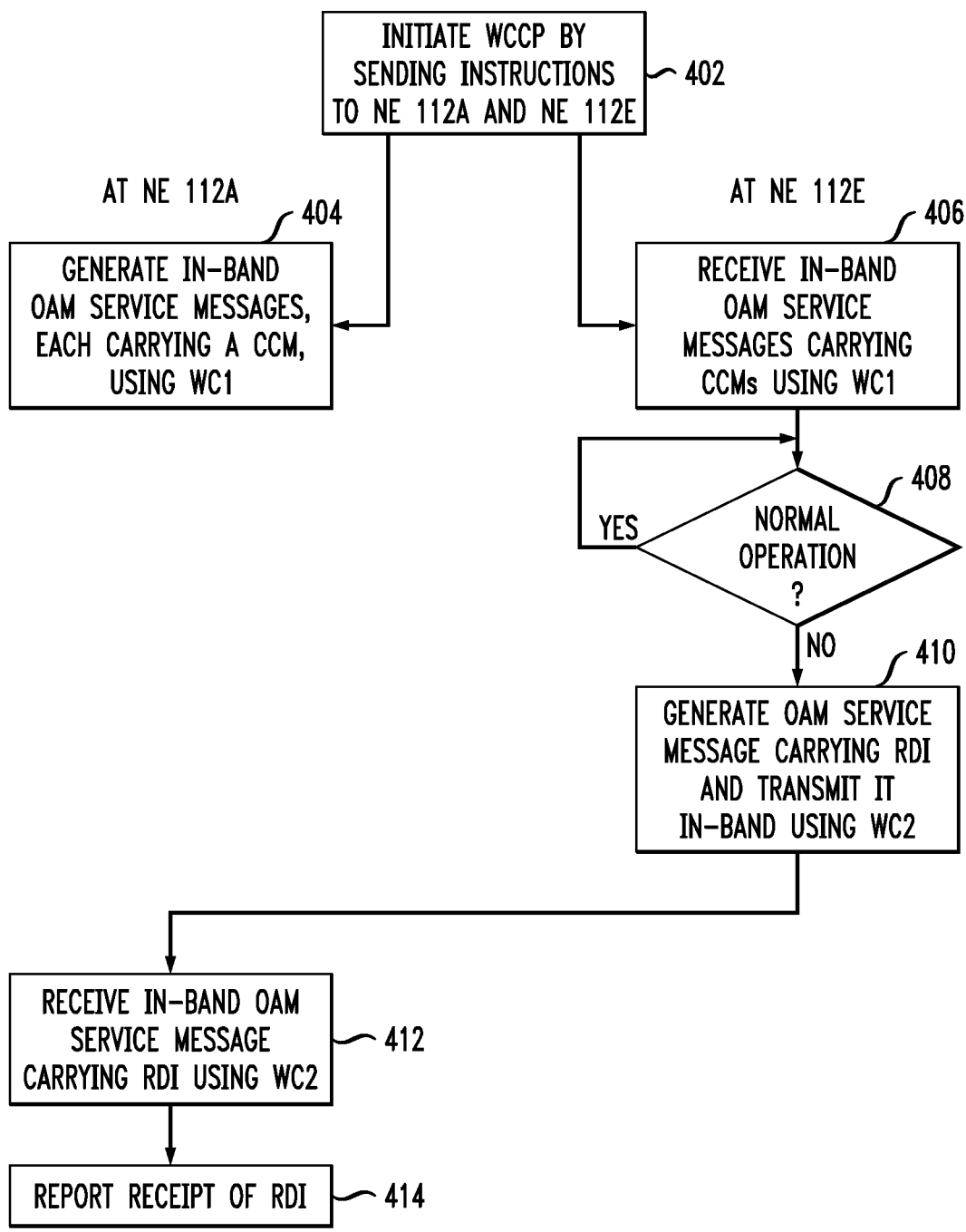
FIG. 4 shows a flowchart of a method of transmitting OAM service messages according to another embodiment of the disclosure.

FIG. 4 shows a flowchart of a method 400 of transmitting OAM service messages according to another embodiment of the disclosure. More specifically, method 400 implements a wavelength continuity-check protocol (WCCP) with remote defect indication (RDI) that is designed to automatically detect and report connectivity failures between two network locations (e.g., endpoints A and E, FIG. 1) in the corresponding optical network path (e.g., network path 110, FIG. 1). One of ordinary skill in the art will understand that multiple instances of method 400 carried out at a plurality of network locations in network 100 can be used to detect and troubleshoot connectivity problems within transport plane 102 (FIG. 1).

For illustration purposes, method 400 is shown and described in reference to NEs 112A and 112E (FIG. 1). The description also assumes that each of these NEs is implemented using a respective instance (copy) of NE 200 (FIG. 2). The description of the various steps of method 400 is given in continuing reference to FIGS. 1-2 and 4. Based on the provided description, one of ordinary skill in the art will understand how to implement method 400 in other configurations, e.g., involving endpoints, intermediate points in different NEs, and/or other embodiments of OAM components.

At step 402 of method 400, a competent entity in control plane 104 or management plane 106 initiates a WCCP by sending appropriate instructions to NEs 112A and 112E. These instructions may be sent, e.g., using control path 118.

At step 404, in response to the WCCP instruction of step 402, NE controller 250 in NE 112A instructs message controller 260 to generate a stream of in-band OAM service messages, each carrying a continuity check message (CCM) using WC1. In one embodiment, these in-band OAM service messages may be generated based on a schedule, e.g., in a periodic manner, with a selected time period. In another embodiment, a mere presence of a particular set of one or more dither tones or subcarriers in WC1 is considered a CCM, even without phase modulation of the dither tones or subcarriers in the particular set. In response to the CCM instruction from NE controller 250, message controller 260 configures an appropriate one of OAM components 216 in NE 112A to send the stream of in-band OAM service messages carrying the CCMs, e.g., in a manner similar to that of step 306 in method 300 (FIG. 3).

At step 406, in response to the WCCP instruction of step 402, NE controller 250 in NE 112E configures an appropriate one of OAM components 216 in NE 112E to start detecting and receiving the in-band OAM service messages of step 404 using optical receiver 220 in the OAM component. Optical receiver 220 is configured to perform an appropriate O/E conversion of each message and direct the resulting electrical form of the received CCM, via electrical control path 222, to NE controller 250.

At step 408, NE controller 250 in NE 112E determines whether or not the stream of CCMs received from the optical receiver 220 of step 406 corresponds to normal operation of network path 110. If yes, then no action is taken by the NE controller 250 and the method 400 loops back to step 408 to continue monitoring the CCM stream. However, if NE controller 250 detects an abnormality in the stream of CCMs received from the optical receiver 220, then the processing of method 400 is directed to step 410. An example abnormality may be an interruption in the stream CCMs. Other abnormalities may also be defined in the WCCP and detected at step 408.

At step 410, NE controller 250 in NE 112E sends a continuity-fault message to the competent entity in control plane 104, management plane 106, or service plane 120. The continuity-fault message may be sent out-of-band, e.g., using electrical control path 252. In addition, NE controller 250 in NE 112E instructs message controller 260 to generate an OAM service message carrying a remote defect indication (RDI). In response to the latter instruction, message controller 260 configures an appropriate one of OAM components 216 in NE 112E to send the generated OAM service message in-band using WC2, e.g., as described above in reference to step 314 of method 300 (FIG. 3).

At step 412, an appropriate one of OAM components 216 in NE 112A receives the in-band OAM service message carrying the RDI transmitted by NE 112E at step 410. Accordingly, optical receiver 220 in the OAM component 216 of NE 112A performs an appropriate O/E conversion of the received message and then directs the resulting electrical form of the RDI, via electrical control path 222, to NE controller 250 in NE 112A.

At step 414, NE controller 250 of NE 112A may report receipt of the RDI to a competent entity in control plane 104, management plane 106, or service plane 120. This reporting message can be transmitted, e.g., via electrical control path 252.

Figure 5:
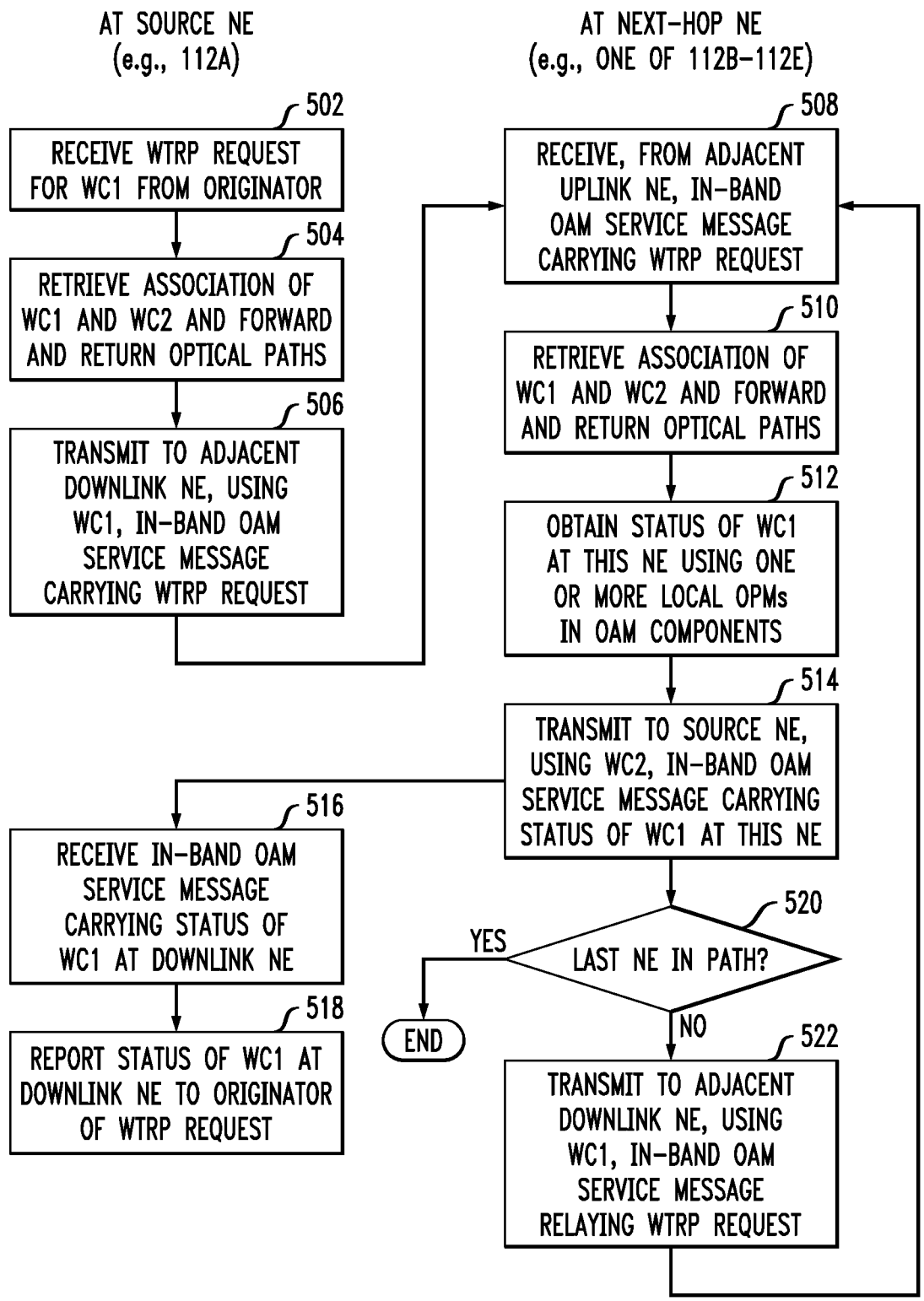
FIG. 5 shows a flowchart of a method of transmitting OAM service messages according to yet another embodiment of the disclosure.

FIG. 5 shows a flowchart of a method 500 of transmitting OAM service messages according to yet another embodiment of the disclosure. More specifically, method 500 implements a wavelength trace route protocol (WTRP) configured to perform path discovery and fault localization in the corresponding optical network path (e.g., network path 110, FIG. 1). One of ordinary skill in the art will understand that method 500 may be used in conjunction with method 300 and/or method 400, e.g., after a connectivity problem has been detected within transport plane 102 (FIG. 1).

For illustration purposes, method 500 is shown and described in reference to NEs 112A-112E (FIG. 1). The description also assumes that each of these NEs is implemented using a respective instance (copy) of NE 200 (FIG. 2). The description of the various steps of method 500 is given in continuing reference to FIGS. 1-2 and 5. Based on the provided description, one of ordinary skill in the art will understand how to implement method 500 in other configurations, e.g., involving endpoints, additional intermediate NEs, and/or other embodiments of OAM components.

At step 502 of method 500, NE controller 250 of NE 112A receives a request to initiate a WTRP for WC1 from an originator, e.g., via electrical control path 252. The originator can be a user, a network operator, or a competent entity in control plane 104, management plane 106, or service plane 120. In this example, the WTRP request identifies network path 110 as the network path to be traced for WC1.

At step 504, in response to the WTRP request of step 502, NE controller 250 of NE 112A retrieves, from resource manager 240, the association of the wavelength channels and forward and return optical paths in network path 110. For this example, we assume that the retrieved association specifies that the forward optical path is associated with WC1 and the return optical path is associated with WC2. Step 504 is generally similar to step 302 of method 300 (FIG. 3).

At step 506, NE controller 250 instructs message controller 260 to generate an OAM service message carrying a WTRP request for the next downlink NE in network path 110, e.g., NE 112B. In response to this instruction, message controller 260 configures an edge OAM component closest to NE 112B, e.g., $216_3$ in NE 112A, to send the generated OAM service message in-band using WC1. In response to the message received from message controller 260, optical modulator $210_3$ generates appropriate drive signals causing the optical modulator to imprint the OAM service message generated by message controller 260 onto the selected one or more dither tones or subcarriers in WC1, thereby transmitting the OAM service message in-band, to NE 112B.

At step 508, an edge OAM component closest to NE 112A, e.g., $216_1$ in NE 112B, receives the in-band OAM service message carrying the WTRP request transmitted by the uplink NE at step 506 or step 522. Optical receiver $220_1$ in OAM component $216_1$ performs an appropriate O/E conversion of the received message and directs the resulting electrical form of the WTRP request, via electrical control path $222_1$, to NE controller 250 of NE 112B.

At step 510, in response to the WTRP request of step 508, NE controller 250 of NE 112B retrieves, from resource manager 240, the association of the wavelength channels and forward and return optical paths in network path 110. As already indicated above in the description of step 504, the retrieved association specifies that the forward optical path in network path 110 is associated with WC1, and that the return optical path in network path 110 is associated with WC2. Step 510 is generally similar to step 310 of method 300 (FIG. 3).

At step 512, NE controller 250 of NE 112B configures the various OPMs 230$_i$ in OAM components 216$_i$ to report back to it the present monitoring results on the status of WC1 in NE 112B.

At step 514, NE controller 250 of NE 112B instructs message controller 260 to generate an OAM service message carrying the monitoring results reported at step 512. In response to this instruction, message controller 260 configures an appropriate one of OAM components 216 in NE 112B to send the generated OAM service message in-band using WC2. For this example, we assume that the appropriate OAM component is OAM component 216$_2$. As such, message controller 260 directs the generated OAM service message to optical modulator 210$_2$ via electrical control path 262$_2$. In response to this message from message controller 260, optical modulator 210$_2$ generates appropriate drive signals causing the optical modulator to imprint the OAM service message generated by message controller 260 onto the selected one or more dither tones or subcarriers in WC2, thereby transmitting the OAM service message in-band, along network path 110 back to NE 112A.

At step 516, an appropriate one of OAM components 216 in NE 112A receives the in-band OAM service message carrying the monitoring results transmitted by NE 112B at step 514. For this example, we assume that the appropriate OAM component is OAM component 216$_2$ in NE 112A. Hence, optical receiver 220$_2$ in OAM component 216$_2$ performs an appropriate O/E conversion of the received message and then directs the resulting electrical signal, via electrical control path 222$_2$, to NE controller 250 of NE 112A.

At step 518, NE controller 250 of NE 112A reports the monitoring results received at step 516 back to the originator of the WTRP request received at step 502. The reporting message can be transmitted to the originator, e.g., via electrical control path 252.

At step 520, NE controller 250 in NE 112B determines whether or not NE 112B is the last NE in network path 110. If yes, then no further action is taken by the NE controller 250 and the processing of method 500 is terminated. However, if NE 112B is not the last NE in network path 110, then the processing of method 500 is directed to step 522.

At step 522, NE controller 250 in NE 112B instructs message controller 260 to generate an OAM service message that relays the WTRP request received at step 508 to the next downlink NE in network path 110, e.g., NE 112C. In response to this instruction, message controller 260 configures an edge OAM component closest to NE 112C, e.g., 216$_3$ in NE 112B, to send the generated OAM service message in-band using WC1. In response to the message received from message controller 260, optical modulator 210$_3$ generates appropriate drive signals causing the optical modulator to imprint the OAM service message generated by message controller 260 onto the selected one or more dither tones or subcarriers in WC1, thereby transmitting the OAM service message in-band, to NE 112C.

After receiving the OAM service message, which relayed the WTRP request of step 508, NE 112C takes over from NE 112B as the next-hop hub for the WTRP. As such, NE 112C substantially repeats steps 508-514 and 520-522, which also causes NE 112A to repeat steps 516-518 based on the report provided by NE 112C at its instance of step 514. The repeated steps are not described here for brevity. One of ordinary skill in the art will be able to reconstruct this description based on the above-given description of steps 508-514 and 520-522 and by substantially replacing NE 112B therein by NE 112C.

The same applies to other subsequent hops of the WTRP, wherein NE 112D and NE 112E sequentially take over as the next-hop hubs.

Figure 6:
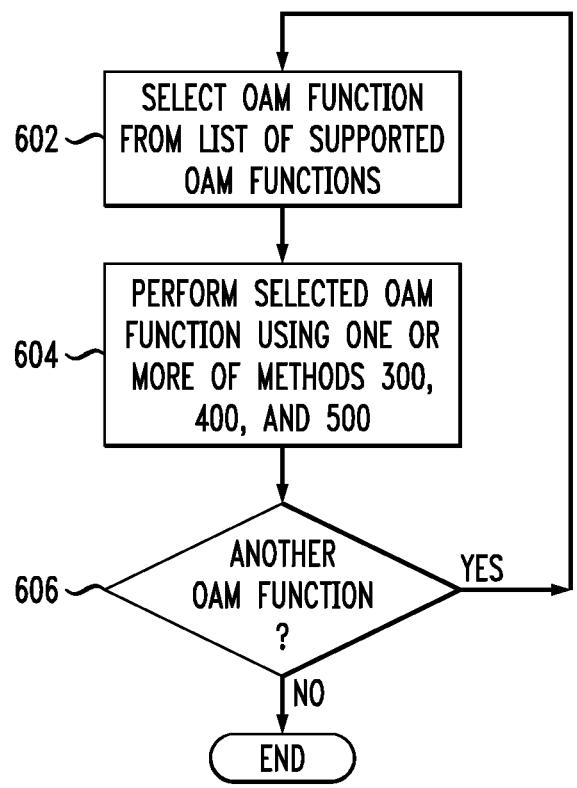
FIG. 6 shows a flowchart of a method of implementing a link-fault-management OAM mechanism according to an embodiment of the disclosure.

FIG. 6 shows a flowchart of a method 600 of implementing a link-fault-management (LFM) OAM mechanism according to an embodiment of the disclosure. Method 600 can be used, e.g., for monitoring optical network paths in transport plane 102 (FIG. 1). In an example embodiment, method 600 can support one or more of the following OAM functions:

(I) RDI during fault conditions;
 (II) Remote loopback mode for network-path performance testing;
 (III) Continuous WC-specific optical network-path monitoring;
 (IV) Fault detection and localization;
 (V) Path discovery;
 (VI) Fault verification, characterization, and isolation;
 (VII) Fault notification; and
 (VIII) Fault recovery.

One of ordinary skill in the art will understand that the above list of OAM functions is not exclusive and that other OAM functions can also be supported by method 600.

At step 602 of method 600, an OAM function is selected from a list of available OAM functions. The entity that selects an OAM function can be a user, a network operator, or a competent automated entity in control plane 104, management plane 106, or service plane 120.

At step 604, network 100 is configured to perform the OAM function selected at step 602. In one embodiment, the selected OAM function can be performed using (i) one of methods 300, 400, and 500; (ii) any combination including two or more of methods 300, 400, and 500; and (iii) any combination of one or more of methods 300, 400, and 500 and one or more other suitable OAM methods, e.g., corresponding to the other OAM layers in plurality 130 (FIG. 1).

For example, the path discovery function can be implemented using method 500. Fault detection can be implemented using method 400. The fault verification and isolation function can be implemented using method 300. Connectivity faults can be recovered by administrator's actions, and the resulting fault recovery can then be verified using one or both of methods 300 and 500, etc.

At step 606, it is decided whether or not another OAM function selected from the list of available OAM functions needs to be performed. If not, then no further action is taken and the processing of method 600 is terminated. If yes, then the processing of method 600 is directed back to step 602. According to an example embodiment disclosed above in reference to FIGS. 1-6, provided is an apparatus (e.g., 100, FIG. 1) comprising a first network element (e.g., any of 112A-112E, FIG. 1) configured to communicate with a second network element (e.g., any of 112A-112E, FIG. 1) via an optical network path (e.g., 110, FIG. 1) and further configured to: transmit (e.g., 308, 316, FIG. 3; 406, 412, FIG. 4; 506, 514, 522, FIG. 5) a first in-band service message to the second network element (e.g., any of 112A-112E, FIG. 1) using a first set of one or more subcarriers of a first wavelength channel (e.g., WC1 or WC2); and receive (e.g., 306, 314, FIG. 3; 404, 410, FIG. 4; 508, 516, FIG. 5) a second in-band service message from the second network element (e.g., any of 112A-112E, FIG. 1) of the optical network path using a second set of one or more subcarriers of a second wavelength channel (e.g., WC2 or WC1). The first network element comprises: one or more OAM components (e.g., 216, FIG. 2), each comprising (i) a respective optical receiver (e.g., 220, FIG. 2) coupled to the optical network path through an optical tap (e.g., 218, FIG. 2) and configured to receive in-band service messages and (ii) a respective optical modulator (e.g., 210, FIG. 2) coupled to the optical network path and configured to transmit in-band service messages without disrupting a flow of user data on an wavelength channel used for the transmission of the in-band service messages; and an electronic controller (e.g., 250/260, FIG. 2) configured to cause one of the respective optical modulators to transmit the first in-band service message and further configured to receive an electric form of the second in-band service message from one of the respective optical receivers, wherein either the second in-band service message is responsive to the first in-band service message or the first in-band service message is responsive to the second in-band service message.

According to another example embodiment disclosed above in reference to FIGS. 1-6, provided is a method of operating a network (e.g., 100, FIG. 1) having an optical network path (e.g., 110, FIG. 1), the method comprising the steps of: at a first network element (e.g., any of 112A-112E, FIG. 1) of the optical network path, transmitting (e.g., 308, 316, FIG. 3; 406, 412, FIG. 4; 506, 514, 522, FIG. 5) a first in-band service message to a second network element (e.g., any of 112A-112E, FIG. 1) via the optical network path using a first set of one or more subcarriers of a first wavelength channel (e.g., WC1 or WC2); and receiving (e.g., 306, 314, FIG. 3; 404, 410, FIG. 4; 508, 516, FIG. 5) a second in-band service message from the second network element (e.g., any of 112A-112E, FIG. 1) via the optical network path using a second set of one or more subcarriers of a second wavelength channel (e.g., WC2 or WC1), wherein either the second in-band service message is responsive to the first in-band service message or the first in-band service message is responsive to the second in-band service message.

In some embodiments of the above method, the first wavelength channel is configured to carry user data without using any subcarrier from the first set.

In some embodiments of any of the above methods, the second wavelength channel is configured to carry user data without using any subcarrier from the second set.

In some embodiments of any of the above methods, the first wavelength channel and the second wavelength channel have different respective optical carrier frequencies.

In some embodiments of any of the above methods, the first wavelength channel and the second wavelength channel have nominally identical optical carrier frequencies but originate at different respective endpoints (e.g., A and E) in the network.

In some embodiments of any of the above methods, the second in-band service message is responsive to the first in-band service message.

In some embodiments of any of the above methods, the first in-band service message carries a WPP request (e.g., 306, FIG. 3); and the second in-band service message carries a response to the WPP request (e.g., 316, FIG. 3).

In some embodiments of any of the above methods, the response to the WPP request includes monitoring information corresponding to the first wavelength channel, the monitoring information generated using an optical performance monitor (e.g., 230, FIG. 2) located at the second network element.

In some embodiments of any of the above methods, the first in-band service message carries a continuity check message (e.g., 404, FIG. 4); and the second in-band service message carries a remote defect indication (e.g., 412, FIG. 4).

In some embodiments of any of the above methods, the first in-band service message carries a WTRP request (e.g., 506, FIG. 5); and the second in-band service message carries a report about a status of the first wavelength channel at the second network element (e.g., 514, FIG. 5).

In some embodiments of any of the above methods, the report includes status of the first wavelength channel in at least two different locations (e.g., 216₁, 216₃; FIG. 2) within the second network element.

In some embodiments of any of the above methods, the first in-band service message is responsive to the second in-band service message.

In some embodiments of any of the above methods, the second in-band service message carries a WPP request (e.g., 308, FIG. 3); and the first in-band service message carries a response to the WPP request (e.g., 314, FIG. 3).

In some embodiments of any of the above methods, the second in-band service message carries a continuity check message (e.g., 406, FIG. 4); and the first in-band service message carries a remote defect indication (e.g., 410, FIG. 4).

In some embodiments of any of the above methods, the second in-band service message carries a WTRP request (e.g., 508, FIG. 5); and the first in-band service message carries a report about a status of the first wavelength channel at the second network element (e.g., 514, FIG. 5).

In some embodiments of any of the above methods, the method further comprises: at the first network element of the optical network path, transmitting (e.g., 522, FIG. 5) a third in-band service message to a third network element (e.g., if the second NE is 112B, then the third NE is 112C, FIG. 1) via the optical network path using a third set of one or more subcarriers of the second wavelength channel (e.g., WC1).

In some embodiments of any of the above methods, the second in-band service message carries a WTRP request (e.g., 508, FIG. 5); and the third in-band service message relays the WTRP request (e.g., 522, FIG. 5).

In some embodiments of any of the above methods, each subcarrier frequency in the third set of one or more subcarriers is nominally identical to a respective subcarrier frequency in the second set of one or more subcarriers.

In some embodiments of any of the above methods, the method further comprises performing (e.g., 604, FIG. 6) an OAM function using the steps of transmitting and receiving, the OAM function selected from a set consisting of: remote defect indication during a fault condition; a remote loopback mode for network-path performance testing; continuous monitoring of the optical network path; fault detection; fault localization; wavelength path discovery; fault verification; fault characterization; fault isolation; fault notification; and fault recovery.

In some embodiments of any of the above methods, the first network element comprises one or more OAM components (e.g., 216, FIG. 2), each comprising: a respective optical receiver (e.g., 220, FIG. 2) coupled to the optical network path through an optical tap (e.g., 218, FIG. 2) and configured to receive in-band service messages; and a respective optical modulator (e.g., 210, FIG. 2) coupled to the optical network path and configured to transmit in-band service messages without disrupting a flow of user data on an wavelength channel used for the transmission of the in-band service messages.

In some embodiments of any of the above methods, the first network element further comprises an electronic controller (e.g., 250/260, FIG. 2) configured to: cause one of the optical modulators to transmit the first in-band service message; and receive an electric form of the second in-band service message from one of the optical receivers.

According to yet another example embodiment disclosed above in reference to FIGS. 1-6, provided is an apparatus (e.g., 100, FIG. 1) comprising an optical network path (e.g., 110, FIG. 1) that comprises an end network element (e.g., 112A, FIG. 1) and an intermediate network element (e.g., any of 112B-112D) configured to communicate with one another using one or more wavelength channels; and a service controller (e.g., 120, FIG. 1) configured to carry out a wavelength-channel service protocol (e.g., WPP, WCCP, WTRP) using the end network element and the intermediate network element. The end network element is configured to: receive a first out-of-band service message (e.g., 302, FIG. 3; 402, FIG. 4; 502, FIG. 5) corresponding to the wavelength-channel service protocol from the service controller; and in response to the first out-of-band service message, transmit a first in-band service message (e.g., 306, FIG. 3; 404, FIG. 4; 506, FIG. 5) corresponding to the wavelength-channel service protocol to the intermediate network element via the optical network path. The intermediate network element is configured to: receive the first in-band service message (e.g., 308, FIG. 3; 406, FIG. 4; 508, FIG. 5) corresponding to the wavelength-channel service protocol from the end network element via the optical network path; and in response to the first in-band service message, transmit a second in-band service message (e.g., 314, FIG. 3; 410, FIG. 4; 514, FIG. 5) corresponding to the wavelength-channel service protocol to the end network element via the optical network path.

In some embodiments of the above apparatus, the end network element is further configured to: in response to the second in-band service message, transmit a second out-of-band service message (e.g., 318, FIG. 3; 414, FIG. 4; 518, FIG. 5) corresponding to the wavelength-channel service protocol to the service controller.

In some embodiments of any of the above apparatus, the intermediate network element is not configured to receive out-of-band service messages corresponding to the wavelength-channel service protocol from the service controller (e.g., because 252, FIG. 2, is absent).

In some embodiments of any of the above apparatus, the intermediate network element is not configured to transmit out-of-band service messages corresponding to the wavelength-channel service protocol to the service controller (e.g., because 252, FIG. 2, is absent).

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments can be embodied in the form of methods and apparatuses for practicing those methods. Some embodiments can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing the patented invention(s). When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. A method for a network element, the method comprising:
    configuring a first network element of an optical network path to transmit a first in-band service message to a second network element via said optical network path using a first set of one or more subcarriers of a first wavelength channel; and
    configuring the first network element to receive a second in-band service message from the second network element via said optical network path using a second set of one or more subcarriers of a second wavelength channel;
    wherein either the second in-band service message is responsive to the first in-band service message or the first in-band service message is responsive to the second in-band service message; and
    wherein the first in-band service message and the second in-band service message are parts of an operations, administration, and management (OAM) function selected from a set including a wavelength continuity-check protocol (WCCP), a wavelength ping protocol (WPP), and a wavelength trace route protocol (WTRP).

2. The method of claim 1,
    wherein the first wavelength channel is configured to carry OAM messages using the first set of one or more subcarriers of the first wavelength channel and further configured to carry payload user data without using any subcarrier from the first set; and
    wherein the second wavelength channel is configured to carry OAM messages using the second set of one or more subcarriers of the second wavelength channel and further configured to carry payload user data without using any subcarrier from the second set.

3. The method of claim 1, wherein the first wavelength channel and the second wavelength channel have different respective optical carrier frequencies.

4. The method of claim 1, wherein the first wavelength channel and the second wavelength channel have nominally identical optical carrier frequencies but originate at different respective endpoints in the network.

5. The method of claim 1, wherein the second in-band service message is responsive to the first in-band service message.

6. The method of claim 5, wherein:
    the first in-band service message carries a WPP request; and
    the second in-band service message carries a response to the WPP request.

7. The method of claim 6, wherein the response to the WPP request includes monitoring information corresponding to the first wavelength channel, said monitoring information generated using an optical performance monitor located at the second network element.

8. The method of claim 5, wherein:
    the first in-band service message carries a continuity check message; and
    the second in-band service message carries a remote defect indication.

9. The method of claim 5, wherein:
    the first in-band service message carries a WTRP request; and
    the second in-band service message carries a report about a status of the first wavelength channel at the second network element.

10. The method of claim 9, wherein the report includes status of the first wavelength channel in at least two different locations within the second network element.

11. The method of claim 1, wherein the first in-band service message is responsive to the second in-band service message.

12. The method of claim 11, wherein:
    the second in-band service message carries a WPP request; and
    the first in-band service message carries a response to the WPP request.

13. The method of claim 11, wherein:
    the second in-band service message carries a continuity check message; and
    the first in-band service message carries a remote defect indication.

14. The method of claim 11, wherein:
    the second in-band service message carries a WTRP request; and
    the first in-band service message carries a report about a status of the first wavelength channel at the second network element.

15. The method of claim 11, further comprising:
    at the first network element of the optical network path,
        transmitting a third in-band service message to a third network element via the optical network path using a third set of one or more subcarriers of the second wavelength channel.

16. The method of claim 15, wherein:
    the second in-band service message carries a WTRP request; and
    the third in-band service message relays the WTRP request.

17. The method of claim 15, wherein each subcarrier frequency in the third set of one or more subcarriers is nominally identical to a respective subcarrier frequency in the second set of one or more subcarriers.

18. The method of claim 1, wherein the first network element comprises one or more OAM components, each comprising:
    a respective optical receiver coupled to the optical network path through an optical tap and configured to receive in-band service messages; and
    a respective optical modulator coupled to the optical network path and configured to transmit in-band service messages without disrupting a flow of user data on an wavelength channel used for the transmission of said in-band service messages.

19. The method of claim 18, wherein the first network element further comprises an electronic controller configured to:
    cause one of said optical modulators to transmit the first in-band service message; and
    receive an electric form of the second in-band service message from one of said optical receivers.

20. An optical network comprising:
    an optical network path that comprises an end network element and an intermediate network element configured to communicate with one another using one or more wavelength channels; and
    a service controller configured to carry out a wavelength-channel service protocol using the end network element and the intermediate network element, wherein:

the end network element is configured to:
  receive a first out-of-band service message corresponding to the wavelength-channel service protocol from the service controller; and
  in response to the first out-of-band service message, transmit a first in-band service message corresponding to the wavelength-channel service protocol to the intermediate network element via the optical network path; and
the intermediate network element is configured to:
  receive the first in-band service message corresponding to the wavelength-channel service protocol from the end network element via the optical network path; and
  in response to the first in-band service message, transmit a second in-band service message corresponding to the wavelength-channel service protocol to the end network element via the optical network path.

21. The optical network of claim 20, wherein the end network element is further configured to:
  in response to the second in-band service message, transmit a second out-of-band service message corresponding to the wavelength-channel service protocol to the service controller.

22. The optical network of claim 20, wherein the intermediate network element is not configured to receive out-of-band service messages corresponding to the wavelength-channel service protocol from the service controller.

23. The optical network of claim 22, wherein the intermediate network element is not configured to transmit out-of-band service messages corresponding to the wavelength-channel service protocol to the service controller.

24. The optical network of claim 20, wherein the intermediate network element is not configured to transmit out-of-band service messages corresponding to the wavelength-channel service protocol to the service controller.

* * * * *